United States Patent [19]

Siegel et al.

[11] 3,822,592
[45] July 9, 1974

[54] INTEGRAL ORIFICE ASSEMBLY FOR HEAD METERS

[75] Inventors: William A. Siegel, Norristown; Herman C. Aafjes, Jr., Hatfield; Herman Marx, Southampton, all of Pa.

[73] Assignee: Fischer & Porter Co., Warminster, Pa.

[22] Filed: Mar. 29, 1973

[21] Appl. No.: 345,838

[52] U.S. Cl. ................................. 73/211, 138/44
[51] Int. Cl. ............................................ G01p 5/14
[58] Field of Search ........... 73/211, 213; 138/40, 44

[56] References Cited
UNITED STATES PATENTS

| 1,559,156 | 10/1925 | Bullock | 73/211 |
| 1,639,342 | 8/1927 | Hanson | 73/211 |
| 2,076,465 | 4/1937 | Kirk | 138/44 |
| 2,764,891 | 10/1956 | McGowen, Jr. | 73/211 |

Primary Examiner—James J. Gill

[57] ABSTRACT

An orifice assembly serving as a primary element of a head flow meter whose secondary element includes a pressure capsule having a pair of pressure chambers disposed within a housing and coupled to respective inlets on the housing wall. The assembly comprises a manifold body directly mounted on the housing wall and including a major longitudinal passage that is connectable to a line carrying the fluid whose flow rate is to be measured. The major passage is divided into two sections by an intermediate breech in the manifold body, the two sections communicating with respective lateral ports that register with the inlets leading to the pressure chambers. Receivable in the breech is a breech block provided with a minor longitudinal passage that links the two sections of the major passage when the block is in place. A replaceable orifice member is insertable in the minor passage to restrict the flow of fluid therethrough to induce a differential pressure that is sensed by the pressure capsule.

6 Claims, 3 Drawing Figures

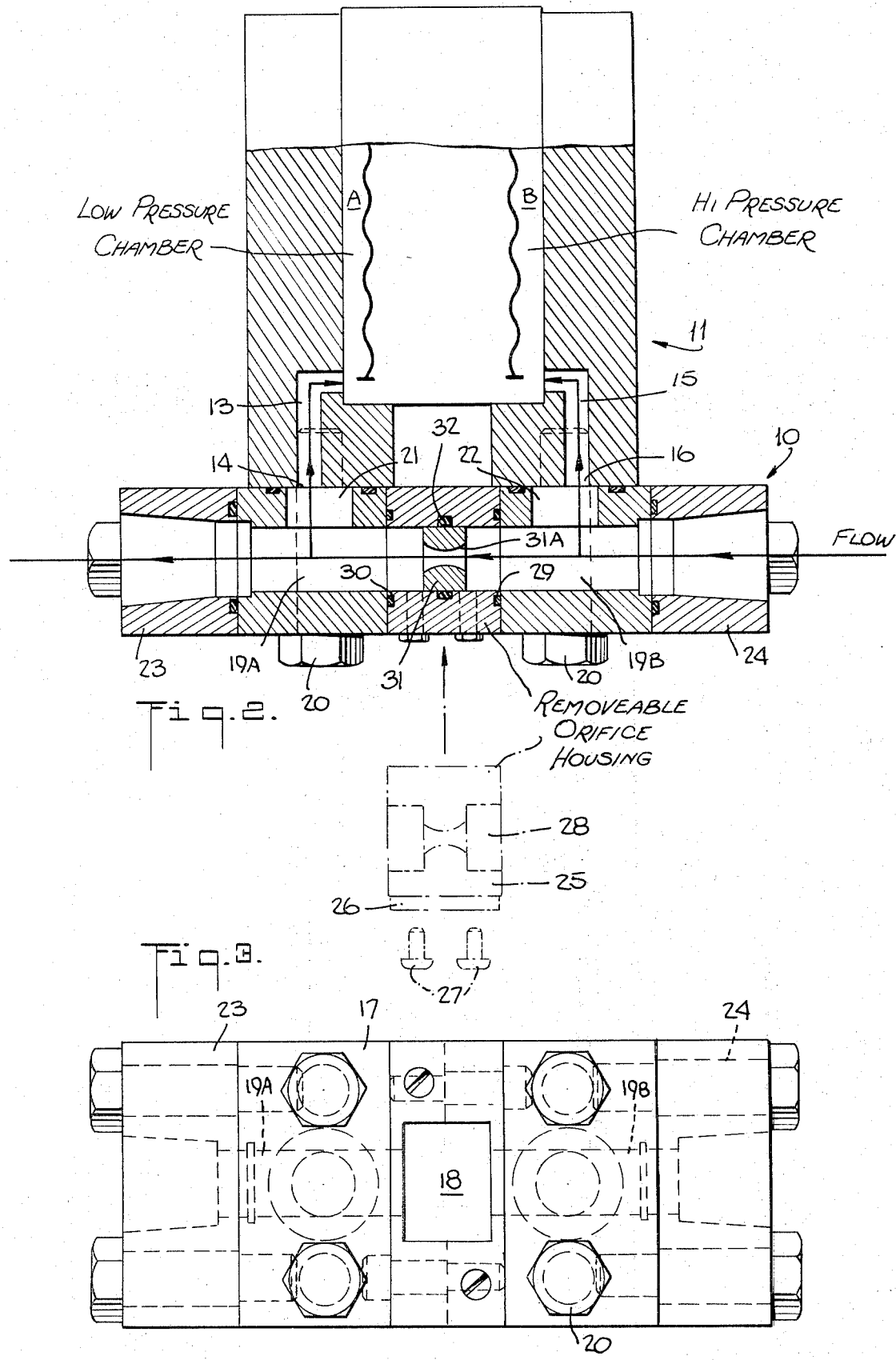

INTEGRAL ORIFICE ASSEMBLY FOR HEAD METERS

BACKGROUND OF INVENTION

This invention relates generally to orifice assemblies for head flow meters, and more particularly to an orifice assembly that is integral with the meter and includes an orifice element that can be removed and replaced without having to break any of the piping connections to the meter.

Head flow meters operate by measuring the pressure differential or head developed across a suitable flow restriction in the pipeline. A head meter consists of a primary element which is some form of restriction in the flow line to induce the head, and a secondary element responsive to the head to measure it as a means of determing the rate of flow. While the present invention will be described in conjunction with a differential pressure transmitter, it is to be understood that it is applicable to other forms of head meters which make use of orifice assemblies to induce a differential head.

In a differential pressure flow transmitter, a force beam is pivoted about a transverse axis. Applied to one end of the beam is an input force derived from a differential pressure capsule, the input force corresponding to the flow rate of the fluid to be measured, to produce a torque about the fulcrum of the beam. A rebalancing force is applied to the beam to a degree sufficient to restore the beam to equilibrium. A detailed description of a commercially available, differential pressure transmitter may be found in the Instruction Bulletin 10B2491-B, published by the Fischer & Porter Company of Warminster Pa., for its 2491 Electronic Differential Pressure Transmitter. A disclosure of a typical differential pressure transmitter can also be found in the Fleming U.S. Pat. No. 3,008,480.

In a conventional differential pressure transmitter of the type disclosed in the Instruction Bulletin or in the patent referred to hereinabove, the pipe carrying the fluid whose flow rate is to be measured is provided with an orifice plate assembly which constitutes the primary element of the instrument. This assembly includes a flow restriction or orifice plate placed in a conduit having pressure taps on either side of the plate, one being a downstream tap and the other an upstream tap. Lines are provided to couple the two taps to the low and high pressure chambers of a differential pressure capsule mechanically coupled to the force beam.

In practice, one cannot use the same orifice plate for all flow rates, for different orifice sizes are needed to handle flow rates within prescribed ranges. Working equations which incorporate empirical constants form the basis for practical calculations for flow rates with a given orifice size or for orifice size with given flow conditions. Such working equations are set forth in the *Process Instruments and Control Handbook*—McGraw-Hill, 1957. Sizing procedures for orifices are also disclosed in the Specification 10B3490S Series, *Pneumatic Differential Pressure Transmitter*, published by the Fischer & Porter Company.

Thus, in the typical differential pressure transmitter installation, it may become necessary to replace the orifice plate with another plate of different size. It may also be necessary, from time to time, to remove an orifice plate for cleaning or repair. Existing designs for orifice plate assemblies are such that one cannot remove an orifice plate for cleaning, replacement or resizing without first breaking the process piping connections. It is not possible to simply remove the orifice plate, for before this can be done, the primary element has to be disconnected from the line and disassembled. Thus any cleaning or replacement operation involves a time consuming and costly procedure.

SUMMARY OF INVENTION

In view of the foregoing, it is the main object of this invention to provide an improved orifice assembly for a head meter, which assembly includes a replaceable orifice member that may be withdrawn for cleaning, replacement or resizing without the need to break the connections to the pipe through which the fluid to be measured is conducted and without having to dismantle the orifice assembly.

More specifically, it is an object of this invention to provide an orifice assembly of the above-described type which serves as the primary element of a head flow meter and is integral with the secondary element thereof, thereby dispensing with the need for piping to couple the primary element to the secondary element and affording a highly compact meter structure.

Still another object of this invention is to provide an orifice assembly which is reliable and efficient in operation, that may be cleaned, repaired or resized without difficulty, and that may be manufactured and sold at relatively low cost.

Briefly stated, these objects are attained in an orifice assembly having a manifold body attachable to the housing wall of a secondary element, the wall being provided with two inlets leading to a pair of pressure chambers in a pressure capsule. The manifold body includes a major longitudinal flow passage connectable to the line carrying the fluid whose rate is being measured, the major passage being divided into two sections by an intermediate breech in the manifold body. The two sections of the major passage communicate with ports in registration with the two inlets on the wall housing of the secondary element leading to the pair of pressure chambers.

Receivable in the breech in the manifold body is a breech block provided with a minor longitudinal passage that links the two sections of the major passage when the block is in place. Insertable in the minor passage is a replaceable orifice member that restricts the flow of fluid therethrough to produce a differential head that is sensed by the pressure capsule.

OUTLINE OF DRAWING

For a better understanding of the invention as well as other objects and further features thereof, reference is made to the following detailed description to be read in conjunction with the accompanying drawing wherein the like elements in the several figures are identified by like reference numerals and wherein:

FIG. 2 is a sectional view taken through the assembly and the pressure capsule of the associated secondary element; and FIG. 3 is an elevational view of the assembly.

DESCRIPTION OF INVENTION

Figure 1:
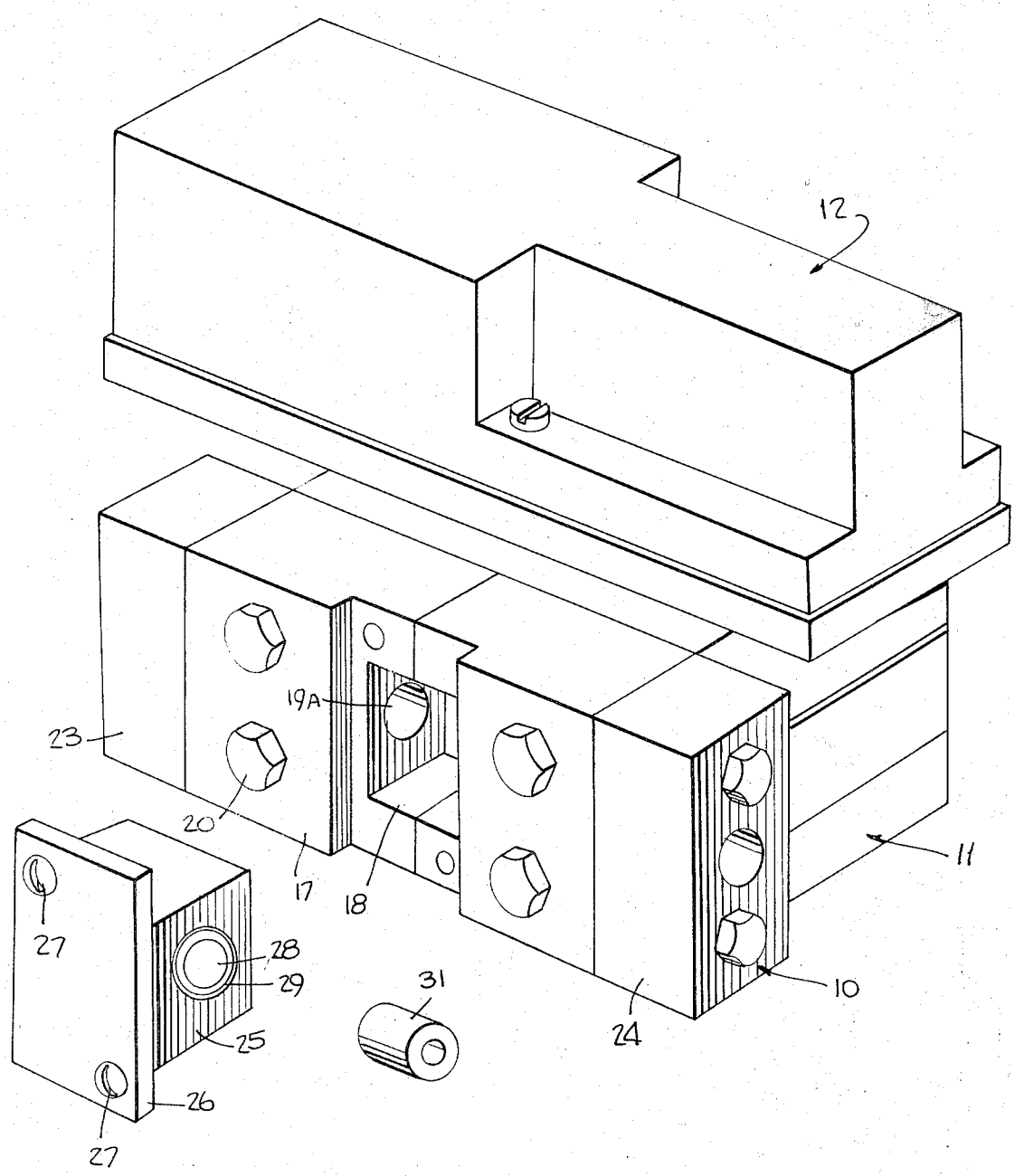
FIG. 1 is a perspective view of an orifice assembly in accordance with the invention which is attached to the secondary element of a head meter, the breech block of the assembly and the replaceable orifice member therefor being shown withdrawn from the assembly.

Referring now to the drawing, there is shown a head meter in the form of a differential pressure transmitter constituted by a primary element, generally designated by numeral 10, which is an orifice plate assembly in accordance with the invention, and a secondary element constituted by a differential pressure capsule 11, above which is mounted a force-beam structure 12.

Within the housing of capsule 11 are two identical pressure chambers A&B, each having a pressure-responsive diaphragm. The two diaphragms of chambers A&B are linked by pins to the lower end of the force beam (not shown). Chamber A is the low-pressure chamber, since it is coupled to the downstream tap of the orifice assembly. Chamber B is the high-pressure chamber, it being coupled to the upstream tap. Since the diaphragms sense a force in proportion to the applied pressures, the forces thereof are unequal to produce a differential force tending to displace the force beam about its fulcrum. The details of the force beam structure, the rebalancing system therefor, and all other aspects of the differential pressure transmitter form no part of the present invention and to the extent that they are mentioned, it is merely for purposes of background.

Pressure chamber A is coupled by a duct 13 leading to an inlet 14 on the front wall of the capsule housing, while pressure chamber B is similarly coupled by a duct 15 leading to a second inlet 16 on the front wall.

Integral with the pressure capsule 11 is the orifice plate assembly 10 which includes a manifold body 17 provided with a longitudinal major passage divided by an intermediate well or breech 18 into two distinct sections 19A and 19B. The manifold body is secured to the capsule housing by bolts 20. Formed in the manifold body is a lateral port 21 communicating with section 19A of the major passage, the port registering with inlet 14 leading to the low-pressure chamber A. Also formed in the manifold body is a second lateral port 22 communicating with section 19B, the second port registering with inlet 16 leading to the high-pressure chamber B.

The major passage in the manifold body is connected to a process line by means of a union connector 23 secured to one end of the manifold and coupled to the passage section 19A of the major passage, and a union connector 24 secured to the other end of the manifold and coupled to the section 19B.

Receivable within breech 18 is a breech block 25 projecting from a mounting plate 26 which is secured to the manifold by a pair of screws 27. Extending longitudinally through breech block 25 is a minor passage 28 which, when the breech block is in place in the manifold, serves to interlink the two sections 19A and 19B of the major passage. The ends of the minor passage are provided with O-ring seals 29 and 30 that serve to prevent any leakage to the atmosphere or by-passing of the orifice. An O-ring 32 is also placed in the center of the passage to effect a seal with respect to the surface of the orifice member inserted therein.

Insertable into the minor passage is a replaceable orifice member 31 in cylindrical form having a constriction 31A therein to restrict the flow of fluid and thereby to induce a differential head. Thus, in operation, fluid passing through the manifold (from right to left in FIG. 2) creates a head whose high-pressure tap is directly coupled to high-pressure chamber B and whose low-pressure tap is directly coupled to low-pressure chamber A.

All that need be done to remove an orifice for cleaning, replacement or resizing is to unscrew mounting screws 27 and withdraw the breech block from the manifold breech, the orifice member then being readily removed from the block. In carrying out this action, the process pipes coupled to the union connectors 23 and 24 remain connected, for there is no need with the present arrangement to break these connections. In practice, the manifold body and union connectors may be made of stainless steel, Monel metal, or other metals and the orifices of chemical pyrex glass or metal.

While there has been shown and described a preferred embodiment of an integral orifice assembly for a head meter, it will be appreciated that many changes and modifications may be made therein without, however, departing from the essential spirit of the invention.

We claim:

1. An orifice assembly for a flow meter secondary element within whose housing is a differential pressure capsule having a pair of pressure chambers in communication with and symmetrically arranged with respect to first and second inlets formed at spaced positions on a wall of the housing, said assembly comprising:
   A. a manifold body mountable against said housing wall and including a longitudinal major passage connectable to a line carrying the fluid whose rate is to be measured, said major passage being separated into first and second sections by an intermediate breech section, said first and second sections being symmetrically arranged with respect to said pressure chambers, said first section communicating with a first lateral port which registers with said first inlet, said second station communicating with a second lateral port which registers with said second inlet;
   B. a removable breech block which is receivable in said breech and includes a longitudinal minor passage that is in axial alignment with said major passage and links the first and second sections of the major passage; and
   C. a replaceable orifice member insertable in said minor passage to restrict the flow of fluid therethrough to produce a differential head which is sensed by said pressure capsule.

2. An assembly as set forth in claim 1, wherein said orifice member is a cylinder having a constriction therein.

3. An assembly as set forth in claim 1, further including union connectors secured to the ends of said manifold body and coupled to respective sections of said major passage to effect connections to the line carrying the fluid.

4. An assembly as set forth in claim 1, wherein said breech block projects from a mounting plate which is fastened by screws to said manifold body.

5. An assembly as set forth in claim 1, wherein said minor passage is provided with sealing O-rings at either end thereof.

6. An assembly as set forth in claim 1, wherein said secondary element includes a force beam structure whose lower end is coupled to diaphragms in said pressure chambers.

* * * * *